United States Patent
Surinx

[15] 3,643,509
[45] Feb. 22, 1972

[54] THERMOCOUPLE LANCE

[72] Inventor: Hubertus Joannes Josephus Surinx, Kuilenbroekstraat 2, Genk, Belgium

[22] Filed: July 7, 1969

[21] Appl. No.: 839,361

[30] Foreign Application Priority Data

Feb. 4, 1969 Luxembourg...........................57920

[52] U.S. Cl. .................................73/354, 73/17 R, 73/359, 136/234
[51] Int. Cl. ......................................................G01k 13/12
[58] Field of Search ....................136/231, 234; 73/354, 359, 73/425.4, 17 R; 141/110

[56] References Cited

UNITED STATES PATENTS 3,294,592  12/1966  Fish......................................136/234
3,357,250  12/1967  Lowdermilk............................73/354
3,455,164   7/1969  Boyle......................................73/354
3,463,005   8/1969  Hance.....................................73/354
3,481,201  12/1969  Falk........................................73/354

*Primary Examiner*—Louis H. Prince
*Assistant Examiner*—Denis E. Corr
*Attorney*—Seidel, Gonda & Goldhammer

[57] ABSTRACT

An expendable thermocouple unit facilitates measuring temperature of a molten bath, obtaining a sample of the bath, and facilitates ascertaining the liquidus arrest temperature of the sample. The unit contains a single thermocouple within a cup-shaped container having thin walls and good thermal conductivity so that the temperature of the sample may equalize the temperature of the bath through the container wall. The container has an entry port at one end so that the sample may enter thereinto to remote from the hot junction of the thermocouple.

10 Claims, 3 Drawing Figures

PATENTED FEB 22 1972 3,643,509

INVENTOR
HUBERTUS JOANNES JOSEPHUS SURINX
BY
Seidel, Gonda & Goldhammer
ATTORNEYS.

THERMOCOUPLE LANCE

The present invention relates to an expendable, immersion-type thermocouple lance, comprising a container provided with an entry opening for a sample of material the temperature of which is to be tested as well as a thermocouple combined with the container.

Expendable thermocouples are currently used in the steelmaking art for measuring the temperature of the molten bath and the temperature of solidification of the steel. The specifications for a particular grade of steel depends essentially on the carbon content and quality depends on the temperature of the molten metal in the furnace. The carbon content may be evaluated, for a known concentration of other components, such as phosphorus or sulphur, from the temperature of solidification of the liquid metal, also referred to as the liquidus arrest temperature.

The known devices for measuring these two temperatures comprise a container mounted inside the lance. A first thermocouple is positioned inside the container and a second thermocouple extends out of the container and is outside the lance. The two thermocouples are connected to a voltage-recording instrument. When the lance is immersed in the molten bath, the container remains substantially at ambient temperature and the sample of metal entering therein is immediately solidified. By means of the second thermocouple located outside the lance the temperature of the molten bath is measured while the first thermocouple inside the container will record the temperature of solidification of the sample of metal.

These known devices are fairly expensive because of the considerable size of the container, when the latter is produced, as is mostly the case, from refractory material. The size of the container in turn determines the diameter of the lance which consequently is heavy and difficult to handle. The containers used heretofore were protected from direct contact with the molten bath. Hence, a large volume container was necessary in order to prevent the molten material from solidifying immediately upon entry into the container. Lastly these known devices require two thermocouples.

The present invention has for its object to overcome such disadvantages and proposes a lance of the subject type which is more economical than the known lances, which enables the two temperatures to be measured with the same thermocouple and the size of which is not substantially larger than the conventional containerless expendable thermocouple lances. For that purpose, according to the invention, the container is mounted as a projection at the end of the lance and the wall of the container has a satisfactory thermal conductibility. Consequently, when the container is immersed in the molten bath, e.g., of molten steel, the container wall will immediately be at the temperature of the bath of molten material and the sample entering the container will be kept at the temperature of the bath as long as the container remains inside the bath. Thus, a measurement of the bath temperature will be taken by means of the thermocouple mounted inside the container. Following the removal of the lance from the bath of molten material, several measurements with the same thermocouple will be made in order to determine accurately the temperature of the sample on solidification thereof.

Due to the fact that I use a container with a good heat transmission and which is not placed inside of a paper tube or other protection materials but is in direct contact with the liquid steel and having a melting point higher than the usual steel bath temperatures, I can reduce considerably the dimensions of my container. The steel bath keeps my sample at the bath temperature level. Removing the container from the bath of molten metal will result in a solidification of the sample. However, the solidification time will be prolonged due to the ambient radiation heat of the furnace. This also allows me to use a container with reduced dimensions.

According to a particularly advantageous form of embodiment of the invention, the thermal conductibility of the wall is such, that the time of its thermal response, i.e., the time needed for raising its temperature substantially to the temperature of the molten bath is less than the time during which the lance is expended.

According to a particularly advantageous form of embodiment of the invention, the container is made of quartz and the thickness of the wall thereof is preferably less than 3 mm.

According to a preferred form of embodiment of the invention the container is cup-shaped, mounted as a projection at the end of the lance and is provided with an opening for the entry of material.

Other features and advantages of the invention will become apparent from the description of a form of embodiment of a thermocouple device according to the invention, hereinafter given by way of nonlimiting example and with reference to the accompanying drawings, wherein.

Figure 1:
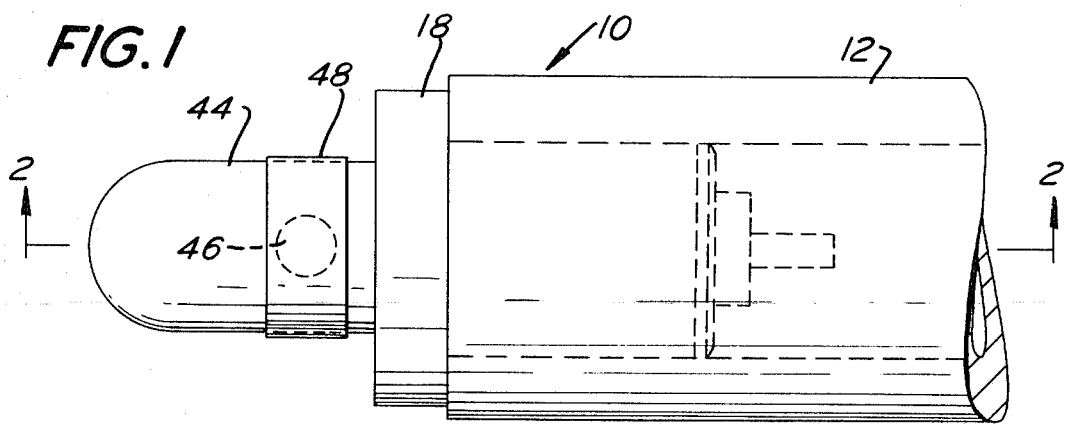
FIG. 1 is an elevational view of the immersion end of a thermocouple device according to the invention.
Figure 2:
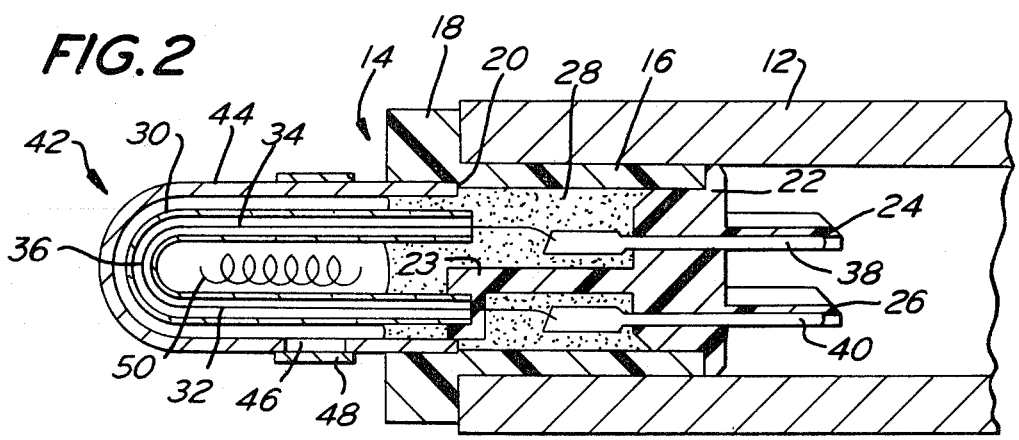
FIG. 2 is a sectional view taken along the line 2—2 of FIG. 1.

In the different figures like numerical references refer to identical elements. The device shown in the drawings includes an expendable lance 10 fabricated in known manner from a support such as a cardboard tube 12 provided at its immersion end with a thermocouple head 14. Head 14 comprises a cylindrical sleeve 16 of ceramic or refractory material having a larger diameter flange 18 and an internal shoulder 20.

The end of sleeve 16 opposite the flange 18 is closed by a base 22 from which project two grooved pins 24, 26. Sleeve 16 is filled inside a filling material, such as cement 28. A U-shaped quartz tube 30, inside which are fitted the wires 32, 34 of a thermocouple projects from the cement 28. The wire 32 is made from platinum and the wire 34 is made from a platinum-rhodium alloy. The hot junction is designated by the reference numeral 36. The wires 32, 34 of the thermocouple are each connected inside the sleeve 16 to one of the lead wires 38, 40 which pass through an opening provided in the base 22 and is fitted inside one of the grooves on the pins 24, 26. The lead wires 38, 40 are kept in place inside the sleeve 16 by means of cement 28. Base 22 may have a support leg 23 to which one arm of tube 30 is connected.

According to the invention, the head 14 is provided with a cuplike container 42 having a cylindrical wall 44, mounted as a projection on the sleeve 16. Container 42 surrounds the U-shaped tube 30 containing the thermocouple hot junction 36. The rim of the container 42 abuts the shoulder 20 of the sleeve 16 so that the container 42 is kept in situ by the cement 28 at the location illustrated.

The container 42 is advantageously made from quartz with its wall 44 thereof having a thickness of 0.8 mm. Container 42 may be made from other refractory-type materials such as Vycor, ceramic, heat resistant cement, silica, carbon, graphite, sintered aluminum oxide, sintered zirconium oxide, sintered magnesium oxide as well as based on any composition of these basic materials, etc., having wall 44 with a thickness between 0.5 and 1 mm. An opening 46 is provided in the cylindrical wall 44 close to the sleeve 16.

The container 42 may be fabricated from a material considered as having a poor thermal conductibility. In that case it will be necessary to reduce the mass of the container so that the thermal conductibility of the wall 44 shall be such that its time of thermal response, i.e., the time needed for raising its temperature substantially to the temperature of the molten bath when the lance is immersed, shall be less than the time during which the lance is expended. In particular, according to the invention, the thermal conductibility of the wall 44 shall be such that its time of response shall be less than 12 seconds.

The opening 46 is protected by a metal ring 48 surrounding the container 42. Such ring provides a seal which, following immersion, melts so as to slightly delay the entry of the sample inside the container 42, in order that such entry shall take place substantially when the temperature of wall 44 shall have reached the molten bath temperature. If desired, the air in container 42 may be evacuated through opening 46 before ring 48 is applied.

When the lance 10 is immersed in the molten steel bath, the container 42, on account of the satisfactory thermal conductibility of the wall thereof, immediately adopts the bath temperature. The ring 48 melts simultaneously, so that as soon as the temperature of the wall of the container 42 shall be substantially equal to the temperature of the molten bath, the opening 46 will be free. The sample of liquid steel flows onto the container through the opening 46 and remains substantially at the bath temperature as long as the head remains in the bath. The bath temperature measurement is then carried out by the thermocouple 32, 34. The lance 10 is thereupon removed from the molten bath and the same thermocouple 32, 34 is used to check the cooling curve of the sample surrounding the U-shaped tube 30 inside the container 42.

It will be noted that lead wire 38 lies along the axis of the lance 10 and that lead wire 40 is parallel thereto. When in use, the lance 10 is telescoped over a pole having contacts which mate with the lead wires 38 and 40. Such a pole with contacts on its end is conventional and shown, for example, in U.S. Pat. No. 3,306,783.

The advantages of the device according to the present application consist particularly in that all the needed measurements are carried out with the same thermocouple. As the container is of a small size, it does not affect the temperature of the molten bath. Oxidation of the sample is prevented to a large extent on removing the lance from the molten bath. If desired, an aluminum wire 50 may be placed inside container 42 to deoxidize the sample. The device is most economical as it may comprise only a single and simple element which supplements the conventional thermocouple head.

Figure 3:
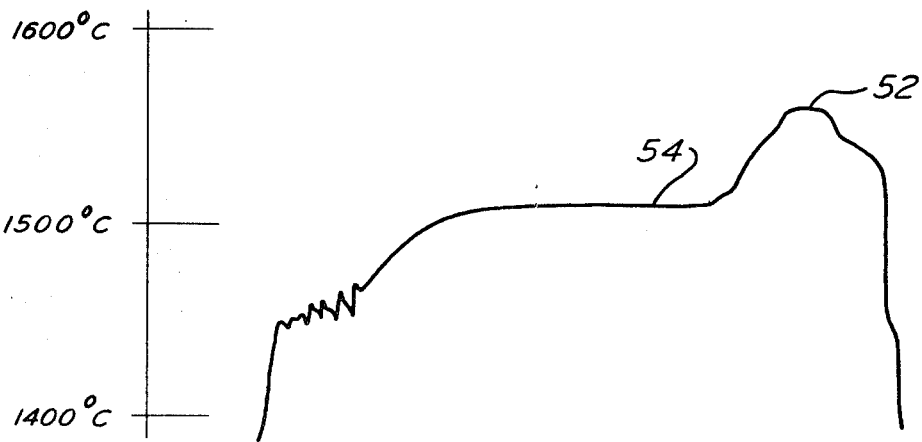
FIG. 3 is a temperature chart.

In FIG. 3, there is illustrated a typical chart obtained during use of this invention. Temperature 52 indicates the bath temperature. Temperature 54 is the liquidus arrest temperature which when used with known charts will yield the carbon content of the sample.

It will be understood that the invention is in no way limited to the described form of embodiment and that many changes may be introduced therein without departing from the scope of the present invention.

It is claimed:

1. An expendable immersion-type thermocouple lance comprising an expendable tube, a container provided with an opening in an exposed portion thereof for entry of a sample of metal, the temperature of which is to be ascertained, a single thermocouple means in the container for measuring bath temperature and liquidus arrest temperature of the sample, the container being mounted as a projection at the immersion end of said tube, the wall of the container having good thermal conductivity such that its time of thermal response is less than 12 seconds, said container being fabricated at least in part from a refractory material, said thermocouple means having a hot junction adjacent the end of the container remote from said tube, said entry opening being located between the other end of said container and the middle of the container.

2. A lance as claimed in claim 1 characterized in that the container is cup-shaped with its rim connected to refractory in said immersion end of said tube, and U-shaped tube in said container to protect said thermocouple means from direct contact with the sample.

3. A lance as claimed in claim 1 characterized in that the container is made from quartz.

4. A lance as claimed in claim 1 characterized in that the thickness of the container wall is less than 3 mm.

5. A lance in accordance with claim 1 wherein the container is a cup of refractory material having a wall thickness of 0.4 to 1 mm.

6. An expendable immersion-type thermocouple unit comprising a support, a cup-shaped refractory container having an opening adjacent its rim for entry of a sample into the container, a single thermocouple means in said container for measuring both the bath temperature by way of said sample and the liquidus arrest temperature of the sample as it solidifies in the container, a sleeve closed at one end and being mounted in said support with the open end of the sleeve being adjacent an immersion end of the support, refractory in said sleeve, the open end of said container extending into and being supported by said refractory with the remainder of the container being an axial extension of said sleeve.

7. Temperature measuring apparatus comprising an elongated tubular support having a receptacle at one end thereof for immersion into a molten bath, said receptacle being made from a material capable of withstanding the temperature of the bath and which will equalize the temperature of the receptacle with the temperature of the bath in less than 12 seconds, said receptacle having transverse dimensions which are not larger than the transverse dimensions of the tubular support, said receptacle having an opening at an exposed location between its middle and the end adjacent said tubular support, said receptacle being an axial extension of said tubular support at said one end thereof, a single thermocouple in the receptacle and shielded from any sample which enters the receptacle for measuring the temperature of any sample in the receptacle while the latter is in the bath and for measuring the temperature of the sample as it solidifies in the receptacle when the receptacle is outside of the bath, said thermocouple having a hot junction on the receptacle axis adjacent the end of the receptacle remote from said one end of said tubular support, refractory cement in said tubular support, said thermocouple and said container being supported by said cement, and the exposed portion of said container having uniform wall thickness.

8. Apparatus in accordance with claim 7 wherein said container is cup-shaped with its rim extending into said cement, said thermocouple being supported by said cement, and said container being a refractory having a wall thickness between 0.4 and 1 mm.

9. An expendable thermocouple lance comprising an expendable cardboard tube having an immersion end, a sleeve within said immersion end, a cup-shaped container having its open end telescopically connected to and forming an extension of said tube, a single thermocouple supported by said sleeve, said thermocouple extending into said container for detecting the liquidus arrest temperature of a sample in said container, said thermocouple being surrounded by a protective refractory material, said container having an opening through which a sample of molten material may flow into the container, said opening being adjacent the immersion end of said cardboard tube, said thermocouple having a hot junction in said container at the end thereof remote from said immersion end of the cardboard tube and lying along the axis of said cardboard tube, the walls of the container having good thermal conductivity such that its time of thermal response is less than 12 seconds, and a seal over the opening and made from a material which deforms under the influence of heat so as to free the opening.

10. A method of maintaining surveillance of a bath of molten metal which includes the steps of immersing an expendable thermocouple lance in the bath comprising using a lance having a single thermocouple disposed in a protective enclosure surrounded by a container having a sealed entry opening, using a container made from a refractory material of good conductivity, providing the container with a uniform wall thickness between 0.4 and 1 millimeter, inserting the immersion end of the lance into the bath, freeing said opening while the container is in the bath so that a sample of the bath flows into the container, detecting the temperature of the sample using said thermocouple, delaying said detecting step for a maximum of 12 seconds after immersion so as to allow for equalization of the temperature of the sample with the temperature of the bath through the walls of the container before said detecting step commences, then removing said immersion end from the bath, then measuring the liquidus arrest temperature of the sample with said thermocouple while the sample solidifies, then permitting the sample to completely solidify, then retrieving the solidified sample for laboratory analysis.